US010664513B2

United States Patent
Antipa

(10) Patent No.: US 10,664,513 B2
(45) Date of Patent: May 26, 2020

(54) AUTOMATIC ENVIRONMENTAL PRESENTATION CONTENT SELECTION

(71) Applicant: Adobe Inc., San Jose, CA (US)

(72) Inventor: Damien Antipa, Saint-Louis (FR)

(73) Assignee: Adobe Inc., San Jose, CA (US)

( * ) Notice: Subject to any disclaimer, the term of this patent is extended or adjusted under 35 U.S.C. 154(b) by 186 days.

(21) Appl. No.: 15/866,984

(22) Filed: Jan. 10, 2018

(65) Prior Publication Data

US 2019/0213264 A1   Jul. 11, 2019

(51) Int. Cl.
*G06F 9/00* (2006.01)
*G06F 16/435* (2019.01)
*G06K 9/00* (2006.01)
*G09F 27/00* (2006.01)
*G01J 5/00* (2006.01)
*G06F 16/438* (2019.01)

(52) U.S. Cl.
CPC .......... *G06F 16/436* (2019.01); *G01J 5/0025* (2013.01); *G06F 16/438* (2019.01); *G06K 9/00302* (2013.01); *G09F 27/005* (2013.01)

(58) Field of Classification Search
None
See application file for complete search history.

(56) References Cited

U.S. PATENT DOCUMENTS

| | | | |
|---|---|---|---|
| 5,777,252 A * | 7/1998 | Tada .................. | G10H 1/361 434/307 A |
| 9,449,254 B1 | 9/2016 | Antipa et al. | |
| 10,043,548 B1 * | 8/2018 | Lynar ................. | G11B 27/28 |
| 2015/0324632 A1 * | 11/2015 | Whitehill ........... | G06K 9/00281 382/159 |
| 2017/0109571 A1 * | 4/2017 | McDuff .............. | G06K 9/00302 |
| 2018/0285641 A1 * | 10/2018 | Yan ..................... | G06F 3/011 |
| 2018/0303397 A1 * | 10/2018 | Krupat ............... | G06Q 30/0271 |

OTHER PUBLICATIONS

"Color psychology", Wikipedia, Jan. 10, 2018.
"Psychoacoustics", Wikipedia, Jan. 10, 2018.
"Vibrant.js", http://jariz.github.io/vibrant.js/, Jan. 10, 2018.
Awasthi, "Facial Emotion Recognition using Deep Learning", Y8084, Indian Institute of Technology Kanpur, 2011.
Duncan et al., "Facial Emotion Recognition in Real Time", CS231n, Stanford University, 2016.
Nummenmaa et al., "Bodily Maps of Emotions", PNAS, vol. III, No. 2, Jan. 14, 2014.
Palmer et al., "Every Song has a color—and an emotion—attached to it", The Conversation, Aug. 21, 2014.

* cited by examiner

*Primary Examiner* — Iman K Kholdebarin
(74) *Attorney, Agent, or Firm* — Kilpatrick Townsend & Stockton LLP

(57) ABSTRACT

Systems and methods present adapted content for a visitor or visitors to a physical environment. A computing device in the physical environment produces a digital media input file associated with at least one visitor to the physical environment and determines a presence of a statistically negative neuro-efferent indicator in the digital media input file. The computing device then selects electronic presentation content based on whether the statistically negative neuro-efferent indicator is present in the digital media file, and provides the electronic presentation content to the physical environment. The electronic presentation content can be selected based on an analysis of an existing library of media selections, either in advance, or at the time of presentation.

20 Claims, 7 Drawing Sheets

AUTOMATIC ENVIRONMENTAL PRESENTATION CONTENT SELECTION

TECHNICAL FIELD

This disclosure relates generally to computer-implemented methods and systems for presenting electronic content on display screens and audio systems, and more particularly relates to techniques for presenting electronic content that is programmatically selected based on analysis of data contained in electronic media files automatically produced during customer interactions taking place in an open, physical environment such as a store.

BACKGROUND

In an establishment with an open environment, such as a retail store or a transportation terminal, there can be one or more electronic displays for displaying information to patrons, customers, guests, or other visitors. Such displays can be large screens mounted in locations that are readily visible, such as above entrances or aisles, near store shelves or product displays, on walls, or in other suitable locations. The displays can be included in embedded devices that are used for a variety of purposes, such as digital signage, product images, advertising, and providing various other forms of information that may be of interest to the visitors. Additionally, many such environments include sound systems for the presentation of music, advertising, or the sound component of videos being presented on the electronic displays.

Media content presented by the above systems is typically selected in advance by management or employees of the relevant enterprise. Content can also be selected, changed or updated from time to time automatically. For example, content may be changed automatically based on time considerations such as whether it is day or night, a weekend or a weekday, or the season. Content may also be automatically changed based on easily detectible conditions such as the number of patrons present or the light level. There is a desire to be able to automatically change or adapt content based on other factors in order to tailor content to specific circumstances in the physical environment.

SUMMARY

In some embodiments, a computing device in a physical environment implements a method that includes producing a digital media input file associated with at least one visitor to the physical environment and determining a presence of a negative neuro-efferent indicator in the digital media input file. The computing device then selects electronic presentation content based on the presence of the negative neuro-efferent indicator present in the digital media file, and provides the electronic presentation content to the physical environment.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
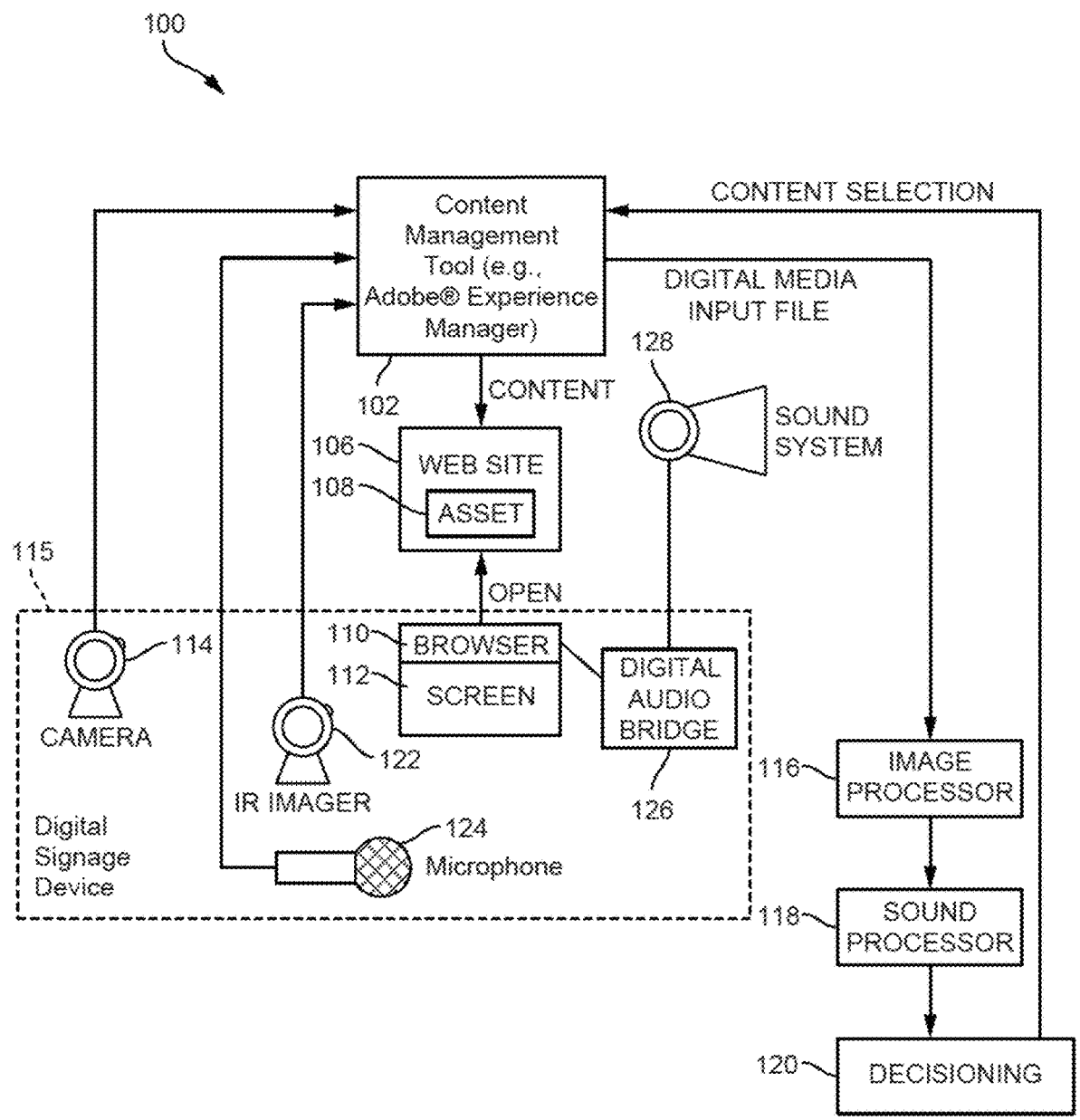
FIG. 1 is a diagram of a system for providing mitigating environmental electronic presentation content to visitors in a physical environment in accordance with some embodiments of the disclosure.

Content displayed on monitors or emitted from sound systems and other electronic media devices in a physical environment using prior techniques is often the same regardless of current conditions, or if updated or changed automatically, is typically changed based on conditions such as the number of patrons present or the time of day. The techniques disclosed here provide adapted electronic content for presentation in a physical environment specifically based on one or more statistical features extracted from digital media input files associated with visitors, patrons, or customers. The digital media input files can include sound, images, or video recorded in the physical environment.

Customer satisfaction can sometimes suffer due to unforeseen circumstances such as technical difficulties, an overwhelming number of people to serve for employee error. Techniques and systems described here use imaging sensors or microphones to record video, images, or sounds of persons in a physical environment. A computing device stores, usually temporarily, these recordings in the form of digital media input files. The computing device then analyzes these digital media input files for features that are known in behavioral science to be statistically correlated with negative perceptions or emotions. Such features are referred to herein as "negative neuro-efferent indicators." The computing device can automatically apply mitigating media assets to digital presentation devices such as display screens or speakers in response to detection of negative neuro-efferent indicators.

Non-limiting examples of a physical environment where these techniques can be used include a service desk where customers interact with employees, or a room that hosts a large number of people passing through, such as one associated with an airport ticket counter or an airport security checkpoint. In some example implementations, a computing device examines an input file or input files associated with a group of visitors to the physical environment, and selects the electronic presentation content based on negative neuro-efferent indicators corresponding to a specified proportion of the visitors.

In order for a computing device to be able to access appropriate electronic presentation material at the appropriate time in the physical environment, the content may be manually assembled in advance and stored where it can be readily accessed by the computing device. Alternatively, the same or a different computing device may analyze available media assets to assemble the electronic presentation material. A computing device can carry out this analysis when a presentation system is initialized, at regular intervals to refresh content based on currently available media, or each time the computing device presents the mitigating content. For example, the computing device can analyze images and videos to determine a dominant color pallet. If sound media is used in the electronic presentation content, the computing device can analyze existing audio assets for certain frequencies, sound pressure levels, and tempos that are known to produce the desired mitigating effects. As part of the analysis, the computing device can insert tags or numerical scores within digital media. The computing device can use scores generated from previously stored analyses results that rate media on its effects.

As used herein, a "neuro-efferent indicator" is an identifiable characteristic in images of or sounds from a person, from which emotional state can be determined with statistically useful confidence. A "negative neuro-efferent indicator" is a neuro-efferent indicator that suggests a negative emotion. As a non-limiting example, a digital input file can include an image or images capturing facial expression, which can be programmatically analyzed to identify an indicator that suggests the person is experiencing a negative emotion. As an additional non-limiting example, the digital input file can include a body heat map, such as that produced by an infrared image sensor, which can also be programmatically analyzed to identify an indicator that suggests the person is experiencing a negative emotion. As an additional non-limiting example, a sound recording of a voice or voices can contain emotion indicators that can be programmatically detected.

As used herein, "media" or "media selections" can include videos (with or without accompanying sound), sound clips, musical performances, slide shows, and the like. As used herein, "electronic presentation content" is a collection of media selections that have been identified as having a potential to mitigate negative emotions in people. Electronic presentation content can also be referred to as "mitigating electronic presentation content" or "mitigating content." A "library" of media selections is a group of media selections available to be presented in a physical environment without regard to the type of analyses described herein. Generally, the term "camera" is used to refer to an visual image (video or still) capture device, and terms such as "IR imager" or "IR sensor" are used to refer to a device that captures infrared (IR) images or video, although in practice such an IR device is typically also a camera similar in many ways to a camera that captures images with visible as the eye would see them. Generally, the term "imaging sensor" or "image capture device" is used to refer to any image capture device, for example, one that can be IR-based, visible-light-based, or both. Other technical terms are defined when used or have their ordinary and customary meaning in the art.

For discussion purposes, it can be assumed that mitigating electronic presentation content is to be presented in an environment where a digital signage device is installed, and embodiments provide a mechanism to let the device communicate with a content management tool and an image processing routine (see, e.g., content management tool 102, image processor 116, and digital signage device 115 in FIG. 1), although an entirely sound-based system can be implemented. In the digital signage context, the device can provide a plain browser or an embedded browser environment using a browser such as, for example, Chromium, to run a web application. The web application, referred to herein as a player application or player app, can be configured to communicate with a web server on the same digital signage device that hosts the player application. In additional or alternative embodiments, the device can render electronic presentation content in a native application or as part of a video using any rendering mechanism. In one embodiment, the communication between the player application and the local web server is over a Websocket connection. For instance, the Websocket connection can be a connection compliant with a World Wide Web Consortium (W3C) standard. In one example embodiment, the local host can be implemented as an embedded web server that provides a data backend. The browser can be used to access a web site that includes media library assets such as image of products, advertising videos, and informational images. Content of the web site can be retrieved from a content management tool. In certain embodiments, this retrieval of web site content and assets is achieved via communications between a digital signage device and a content management tool (see, e.g., digital signage device 115, content management tool 102 and asset 108 in FIG. 1). These communications may be done through Websocket connections.

To this end, and in accordance with embodiments, techniques are disclosed for presenting content that is adapted to a visitor to an establishment that is in a gathering area with a digital signage device's display screen. The digital signage device is configured to execute a local web browser, which can include a suitable player application for retrieving, displaying, and interacting with content. The device can be a digital signage device. The device can include a camera, microphone, or infrared (IR) imager (such as an IR camera) and can use the Web Real-Time Communication (WebRTC) application programming interface (API) to access such devices. The web browser of the device can be configured to display, among other things, electronic assets and web content, such as, for example, interactive web content, signage, product images, and marketing content including offers and advertisements.

By using an image capture device such as a camera or IR imager, the digital signage device can detect that a customer is present, and then use the image capture device to capture an image of the customer. That is, the image of the customer serves as input obtained via the digital signage system's image capture device. The image capture device can capture images periodically. For instance, a webcam installed near the screen can capture video frames every second or every five seconds. When it is determined that a captured image (e.g., a video frame) includes at least one visitor, the device provides the video frame to a system as a digital media input file. This digital media input file can be said to be "associated" with the visitor that is depicted, or if multiple visitors are captured, can be said to be associated with each of the visitors in the frame. An image processor application run by a computing device can analyze this image and determine whether a negative neuro-efferent indicator is present in the digital media input file. Decisioning can be carried out by the computing device using appropriate computer program code as to the statistical significance of the indicator or indicators, and in response to the presence of negative neuro-efferent indicators, the computing device can select electronic presentation content for the digital signage system that may mitigate negativity on the part of the visitors or a visitor.

Another example use case is as follows. In a location such as a retail store, a small screen is displaying content of the store's website. This small screen could be in a tethered device (e.g. a tethered tablet) or the display in a point-of-sale terminal. These devices are close to the customer and therefore optimal for cognitive stimulation. A shopper in the store interacts with the screen, or in the case of the point-of-sale terminal display, is detected using standard motion detection techniques. As the shopper is viewing the device, an imaging sensor in the device captures an image of the shopper and this image is used to create a digital media input file for analysis. This digital media input file can be said to be "associated" with the visitor that is depicted. This digital media input file and others can be used by the system as described above. An image processor application run by a computing device can analyze this image and determine whether a negative neuro-efferent indicator is present in the digital media input file, and cause the system to switch from displaying the store's website to displaying electronic presentation content for the digital signage system that may mitigate negativity on the part of the visitors or a visitor.

In another example use case, a microphone or microphones can be incorporated into a digital signage system, or can be placed in the physical environment where the digital signage system is located. The microphone can capture sound clips periodically. When it is determined that a captured sound clip includes the voice at least one visitor, the sound input hardware provides the sound clip as a digital media input file. This digital media input file can be said to be "associated" with the visitor that is recorded, or if multiple visitors are recorded, can be said to be associated with each of the visitors. A sound processor application run by a computing device can analyze this sound and determine whether a negative neuro-efferent indicator is present in the digital media input file. Decisioning can be carried out by the computing device using appropriate computer program code as to the statistical significance of the indicator or indicators, and in response to the presence of negative neuro-efferent indicators, the computing device can select electronic presentation content for the digital signage system that may mitigate negativity on the part of the visitors or a visitor.

Electronic content can be in the form of electronic content streamed from a server system to a client computing device. Streaming electronic content can include, for example, audiovisual content provided using a streaming protocol, such as, but not limited to, real time messaging protocol (RTMP), HTTP dynamic streaming (HDS), and HTTP Live Streaming (HLS).

In an example embodiment, a web site displayed at a digital signage device can connect to a content management tool and a library of presentation media selections for content retrieval purposes. For example, an in-store digital signage device can connect to a remote server of a content management tool to obtain campaign assets and content for a store website. The digital signage device retrieves content for a website, which can be shown to a store visitor on a large screen (e.g., a connected/smart television, a conventional television, or computer display device, including a liquid crystal display (LCD) or a light emitting diode (LED) display) of the digital signage device. The content can include images, video, or code executable for rendering images, video and/or text on the display (e.g., JavaScript code). The content can include electronic campaign assets, such as, for example, documents, graphics, advertisements, presentations, streaming content, HTML files, or any other form of data. The content, when displayed on the digital signage device, can be adapted to contain mitigating electronic presentation content. Such content can be displayed on a screen of the digital signage device. The digital signage device can be embodied, for example, as an embedded device with a large, mounted screen and/or a mobile device. The digital signage device can be associated with a certain location in an open environment, such as an area of a store, a lobby of a building, a public transit station, a conference room in a building, or a publicly accessible location.

The adapted content can be created manually or automatically. In order to be able to switch to a mitigating visual, audio or audiovisual presentation in a physical environment, available media assets may can be analyzed by a computing device to assemble such electronic content for presentation in the physical environment. The computing device can carry out the analysis when a system is initialized, at regular intervals to refresh the mitigating electronic presentation content based on currently available media, or each time the system presents the mitigating electronic presentation content. For example, images and videos can be analyzed to determine a dominant color pallet. These colors can be classified using principles of color psychology. As an example, pastel colors, cold colors, and mutual earth tones can be calming to people. Sound can also be used in the background to give visitors to a physical environment a more relaxed disposition. Audio media can be analyzed using the principles of psychoacoustics. For example, certain frequencies, sound pressure levels, and tempos can produce the desired effects. As a non-limiting example, sounds of ocean waves are known to have a calming effect on people. An analysis as described above can result in tags within media, or a more sophisticated score being assigned to assets in a library of media selections. A score can optionally be generated from a previous stored analyses that rate media on non-calming colors and sound frequencies.

FIG. 1 illustrates an example system 100 for adapting content to visitors to an environment. Certain components of system 100 can be implemented, for example, in an open environment such as a retail store. System 100 is configured to be able to switch from typical campaign content to mitigating electronic presentation content for visitors to an environment, such as shoppers in a store. As shown, system 100 includes a content management tool 102, and a digital signage device 115 with a browser 110, a display screen 112, and a camera 114. The system 100 also includes an image processor 116, a sound processor 118, and decisioning process 120. The system further includes an IR imager 122 and a microphone 124. In some installations, only one of the camera, IR imager, microphone would be used, but all could be used together and all are shown in FIG. 1 for illustrative purposes. The example system 100 also includes a digital audio bridge 126, which supplies audio to a premises sound system 128. The components of system 100 can be connected to each other via a local area network (LAN), and/or a wide area network (WAN) such as the Internet. Some of the components, such as digital signage device 115, can be installed locally in an open environment such as a retail store.

In an embodiment, system 100 can comprise one or more components, such as, but not limited to, content management tool 102, an input device configured to interact with a browser such as browser 110, a touch screen display device configured to render a content view, such as screen 112. As shown, a digital signage device 115 can include browser 110, screen 112, either or both of the imaging devices, and microphone 124. In additional or alternative embodiments, digital signage device 115 can render electronic content in a native application or render video using any rendering mechanism. Embodiments are not limited to this example system 100, and it would be apparent to those skilled in the art that other display devices can be used in embodiments described herein as digital signage devices, including, but not limited to, embedded devices, personal computers, mobile devices such as smart phones, laptops, tablet computing devices, or other devices suitable for rendering content on a display such as screen 112. Many additional devices can be used with system 100, beyond the components and devices illustrated in FIG. 1. In an embodiment, a digital signage device may be integrated with screen 112, so that the two form a single, integrated component. For example, digital signage devices can include any suitable computing devices for communicating via a LAN and/or WAN, rendering a user interface (UI), and/or executing browser 110 to render web site 106 with asset 108. As shown in FIG. 1, each of the content management tool 102 and browser 110 are communicatively coupled to each other. This coupling can be through a local area network (LAN) such as a LAN at a retail store. The components of system 100 shown in FIG. 1 can also be communicatively coupled through a wide area network (WAN). Although not depicted in FIG. 1, in an alternative embodiment, a content repository can be located separately from system 100 and content management tool 102.

Content management tool 102 can include any suitable computing system for hosting and delivering content. For instance, content management tool 102 can include a back-end server that is remote from digital signage device 115 at a store. As described below with reference to FIG. 7, a web management system can be implemented on a computing system having a single processor in a multi-core/multiprocessor system. Such a system can be configured to operate alone with a single back end server, or in a cluster of computing devices operating in a cluster or server farm used to implement content management tool 102. This processor system in some embodiments is also the computing device that executes the image processor, sound processor, and decisioning process shown in FIG. 1, through the use of computer program code stored in a non-transitory medium.

Although only a single digital signage device 115 is shown in FIG. 1, it is to be understood that by using system 100, adapted content can be presented to multiple digital signage devices in an environment such as a store, as well as produced at multiple speakers in sound system 128 in such a physical environment. Digital signage devices 115 at different locations in a store can establish respective network connections via a LAN with each other. The digital signage devices can also establish respective network connections with content management tool 102. A browser 110 or content player application can be executed at digital signage device 115 to establish network connections via a LAN to access content of web site 106. The network connections can be used to provide electronic presentation content by communicating packetized data representing the content to digital signage devices 115.

The content management tool 102 can be located off-site, remote from a store location where browser 110, screen 112, imaging device, and microphone 124 are located. The content management tool 102 can be implemented as part of a content management system providing a marketer user interface (UI), a staging area for campaign content, and publishing of activated campaign assets. In one example embodiment, a content management tool such as Adobe® Experience Manager can be used as the content management tool 102. The content management tool 102 can maintain sets of assets for a promotional or marketing campaign as well as mitigating content, any of which can be displayed on screen 112 or produced through sound system 128. In some embodiments, content management tool 102 can be implemented as a content delivery system.

Figure 2:
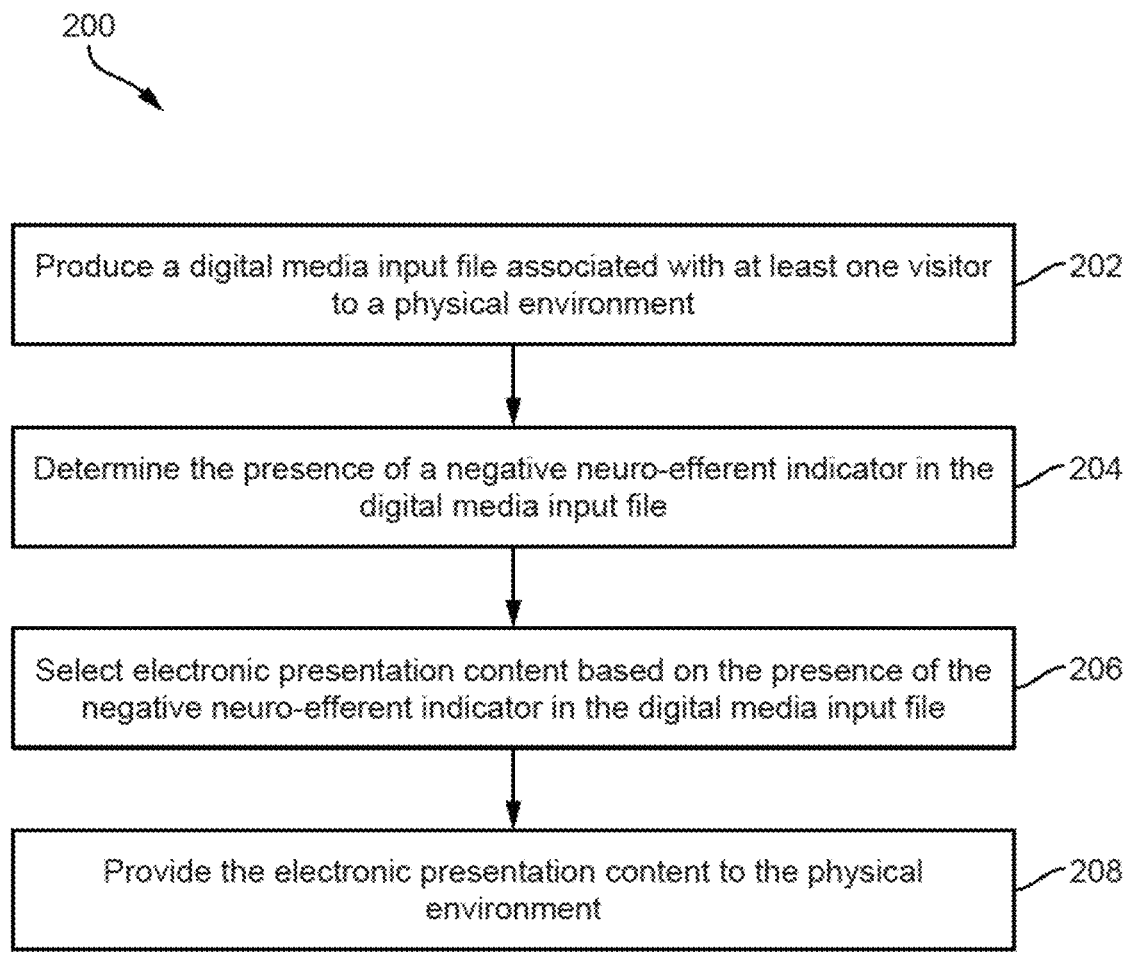
FIG. 2 is a flowchart depicting an example of a process for providing mitigating environmental electronic presentation content to visitors in a physical environment in accordance with some embodiments of the disclosure.

FIG. 2 presents a flowchart depicting an example of a process 200 for automatic presentation content selection by a computing device carrying out the process by executing suitable program code. The content selection is based on detection of negative neuro-efferent indicators associated with visitors to a physical environment. At block 202 a computing device in a physical environment produces a digital media input file associated with at least one visitor to the physical environment. This digital media input file can contain an infrared image, a visual image, an audio clip, or a combination of any or all of these. The file is produced by the computing device using, as an example, camera 114, IR imager 122, or microphone 124 of FIG. 1. At block 204, the computing device determines whether a negative neuro-efferent indicator is present in the digital media input file. This determination can be made by image processor 116 or sound processor 118 of FIG. 1, and decisioning process 120 of FIG. 1. At block 206, the computing device selects electronic presentation content based on the presence of the negative neuro-efferent indicator. This selection is communicated to the content management tool 102 by decisioning process 120 as shown in FIG. 1. At block 208, the electronic presentation content is provided to the physical environment. This content can be stored at a web server as asset 108 and can be ultimately communicated to digital signage device 115 of FIG. 1.

Figure 3:
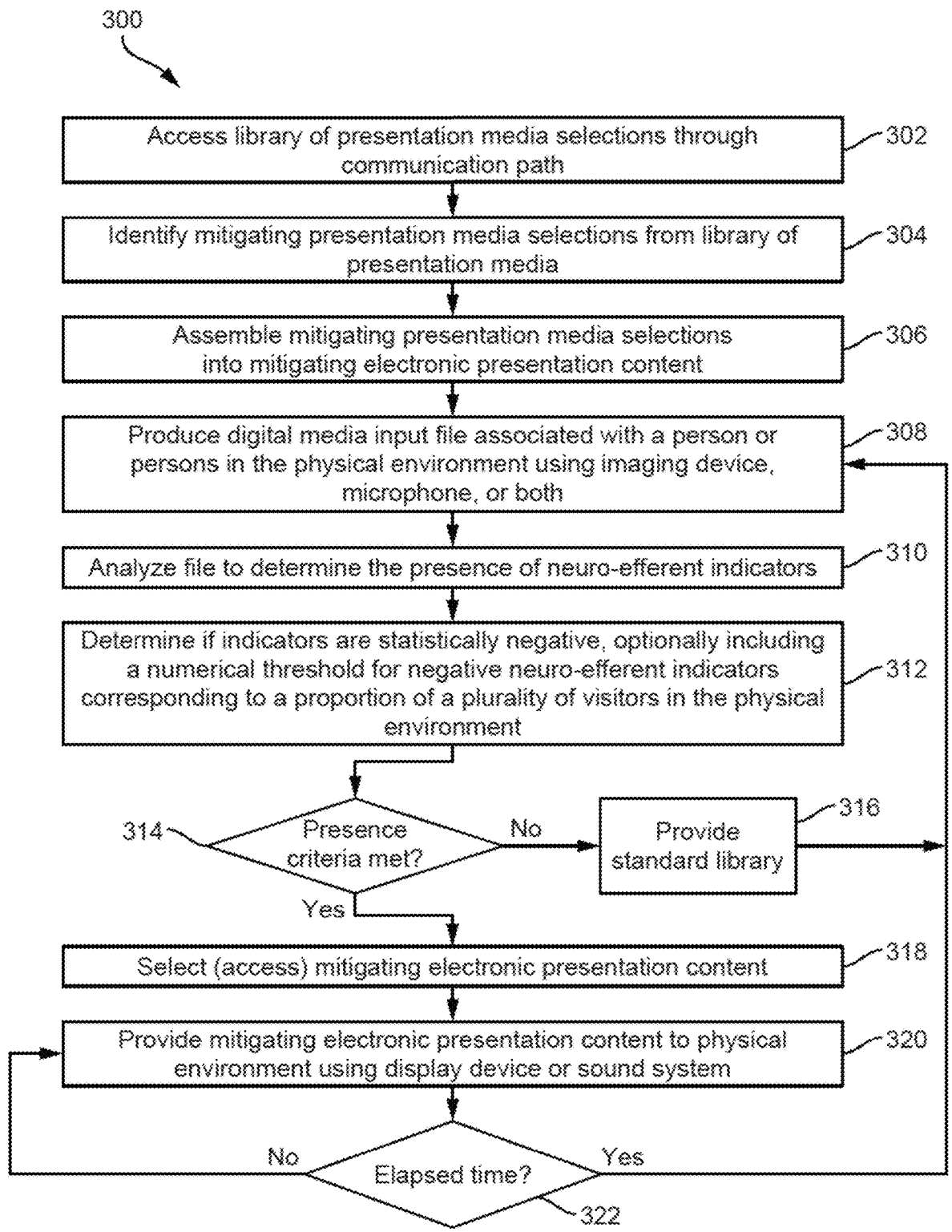
FIG. 3 is a flowchart depicting an additional example of a process for providing mitigating environmental electronic presentation content to visitors in a physical environment in accordance with some embodiments of the disclosure.

FIG. 3 is a flowchart depicting an example process 300 for both assembling mitigating electronic presentation content, and for automatic presentation of the content by a computing device carrying out these processes by executing suitable program code. For purposes of this example, it can be assumed that a system like that shown in FIG. 1 automatically creates presentation media content at initialization to be used during ongoing operation when negative neuro-efferent indicators are detected. Presumably, it would be initialized some reasonable interval for maintenance or updates, and therefore the content can be refreshed at those times based on a current library of media selections. Mitigating presentation content could also be assembled according to a schedule, when prompted by a user, or each time it is required. At block 302 a computing device accesses a library of presentation media selections. At block 304, the computing device identifies mitigating presentation media selections from the library. This identification can be made by scanning the selections for a dominant color pallette, or by examining a sound component for sound samples with a sound frequency spectrum, a sound pressure level, a tempo, or a combination of these characteristics that are known in psychoacoustics have the effect of mitigating negative emotions. A dominant color palette in an image can be obtained using a JavaScript like "Vibrant," which is a port of the "awesome Palette class" used in the open Android® mobile platform. The required analysis can be carried out by image processor 116 and sound processor 118, the same components that also analyze digital media input files to determine whether mitigating electronic presentation content is to be selected. At block 306, mitigating presentation media selections are assembled into mitigating electronic presentation content to be used when automatically selected.

Still referring to FIG. 3, at block 308, a computing device in the physical environment produces a digital media input file associated with at least one visitor to the physical environment. This digital media file can contain an IR image, a visual image, a sound, or a combination of any or all of these. The file is produced by the computing device using, as an example, camera 114, IR imager 122, or microphone 124 of FIG. 1. In the examples described herein, this file is only retained long enough to perform the necessary analysis, and may be temporarily stored in a memory buffer created in RAM. At blocks 310 and 312 in FIG. 3, a determination of the presence of the negative neuro-efferent indicators is made, as shown in block 204 of FIG. 2. At block 310 of FIG. 3, the digital media input file is analyzed to determine the presence of neuro-efferent indicators. As examples, in the case of an IR image, the portion of the image that represents the body of the visitor is a treated as a body heat map. This body heat map is analyzed to determine if clear color (temperature) differences over different portions of the body can be identified. These patterns can serve as neuro-efferent indicators. If these differences can be identified, the body heat map is analyzed to identify the color differences across portions of the body heat map and the body heat map is compared to at least one reference heat map based on the color differences. In the case of a visible-light image captured by a camera, the image is analyzed to determine if a facial expression can be ascertained and this expression is then used as a neuro-efferent indicator. Emotions indicated by facial expressions can be ascertained using an application programming interface (API) designed for such a purpose, such as Microsoft's "Emotion API." In some embodiments, an image is analyzed to identify a facial expression, which is then compared to a reference library of facial expressions using a model that has been trained with the reference library of facial expressions. If the digital media input file contains a voice recording, the recording is analyzed to determine if certain characteristics that are known to be correlated with emotional responses exist. These analyses are carried out by the image processor 116 or the sound processor 118, both shown in FIG. 1.

Continuing with FIG. 3, at block 312, a determination is made as to whether negative neuro-efferent indicators are present with statistical significance. This decision can be made by decisioning process 120 of FIG. 1. Typically, computer program code instructions analyzing such indicators will produce a specified confidence level for each of various emotional states including at least one negative state. If the confidence level for one or more negative states is significantly higher than the others, then a negative neuro-efferent indicator is present with statistical significance. In addition to statistical analysis, some embodiments optionally include a numerical threshold for negative neuro-efferent indicators. The threshold can correspond to a portion of the visitors present in the physical environment. As a non-limiting example, the system might be designed to react only if more than half of those present are likely experiencing a negative emotion. At block 314, if the negative neuro-efferent indicator presence criteria are not met, the standard media presentation continues at block 316, and digital media input files continue to be produced and examined at block 308. However, if the statistical criteria for the presence of negative neuro-efferent indicator are met at block 314, the system selects the appropriate electronic presentation content based on the presence of the negative neuro-efferent indicator(s) at block 318. This selection can be communicated to the content management tool 102 by decisioning process 120 as shown in FIG. 1. At block 320, the electronic presentation content is provided to the physical environment, and the content management tool 102 can access the mitigating content. Alternatively, decisioning process 120 can access the mitigating content. In the example of FIG. 3, after a predetermined elapsed amount of time at block 322, digital media files are again scanned beginning at block 308. The mitigating electronic presentation content can then continue if necessary, or the presentation of standard library assets to the physical environment can resume at block 316.

Figure 4:
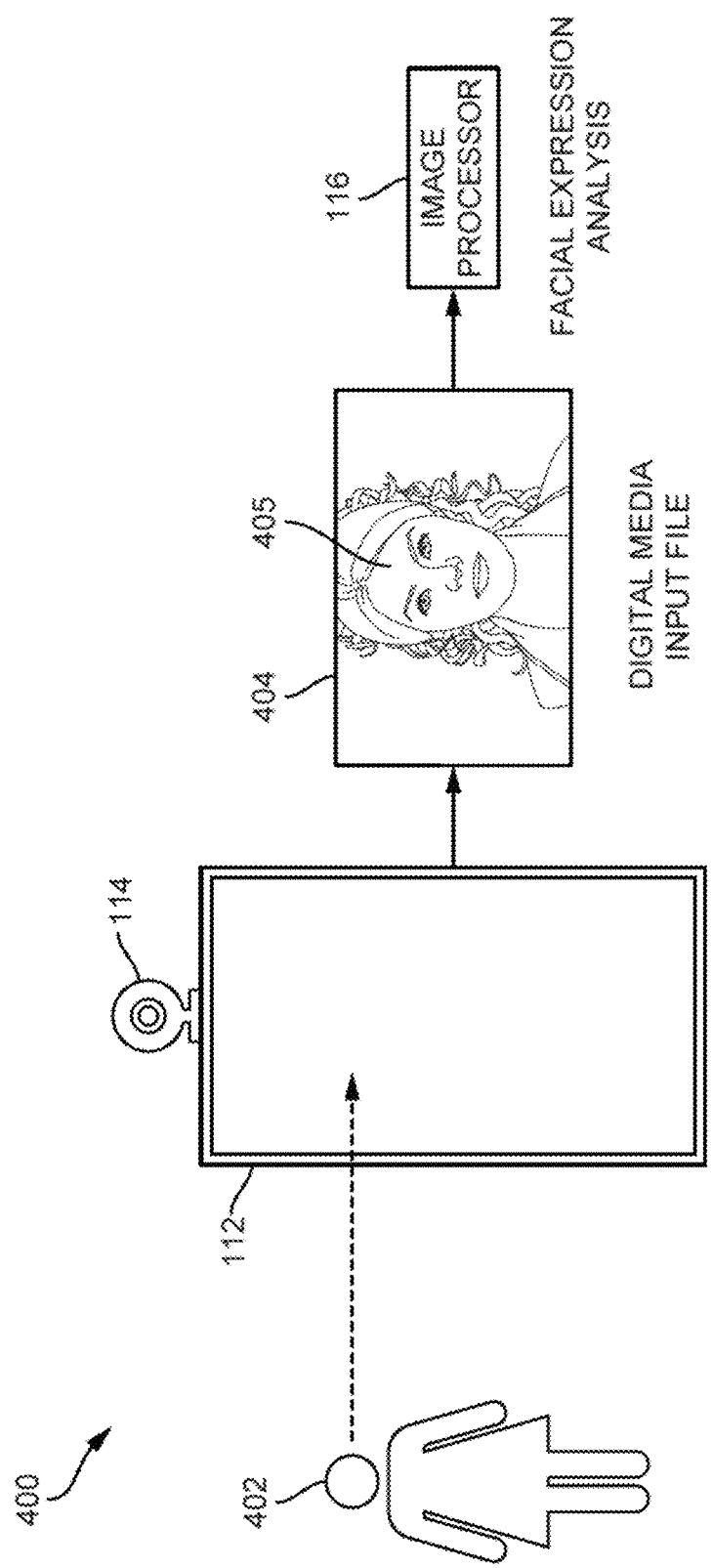
FIG. 4 illustrates an example workflow for creating a digital media file associated with a visitor to physical environment and selecting electronic presentation content based on an analysis of the digital media file according to some embodiments.

FIG. 4 illustrates an example workflow for creating a digital media file associated with a visitor to physical environment and selecting electronic presentation content based on an analysis of the digital media file. FIG. 4 depicts a physical environment 400, with a visitor, 402. Physical environment 400 also includes a screen 112 and an imaging device, camera 114. Camera 114 is used to produce digital media input file 404. This digital media input file 404 includes an image of the face 405 of visitor 402. If the digital media input file includes more images than the face 405 in the image depicted, such as background items of other parts of the visitor's body, the image can be appropriately processed to obtain the requisite detail in the face, for example, by zooming, croping or masking. Digital media input file 404 is analyzed by image processor 116 to detect neuro-efferent indicators and hence of the emotion indicated by the facial expression exhibited in face 405. The above described statistical analysis and content selection is then carried out.

Figure 5:
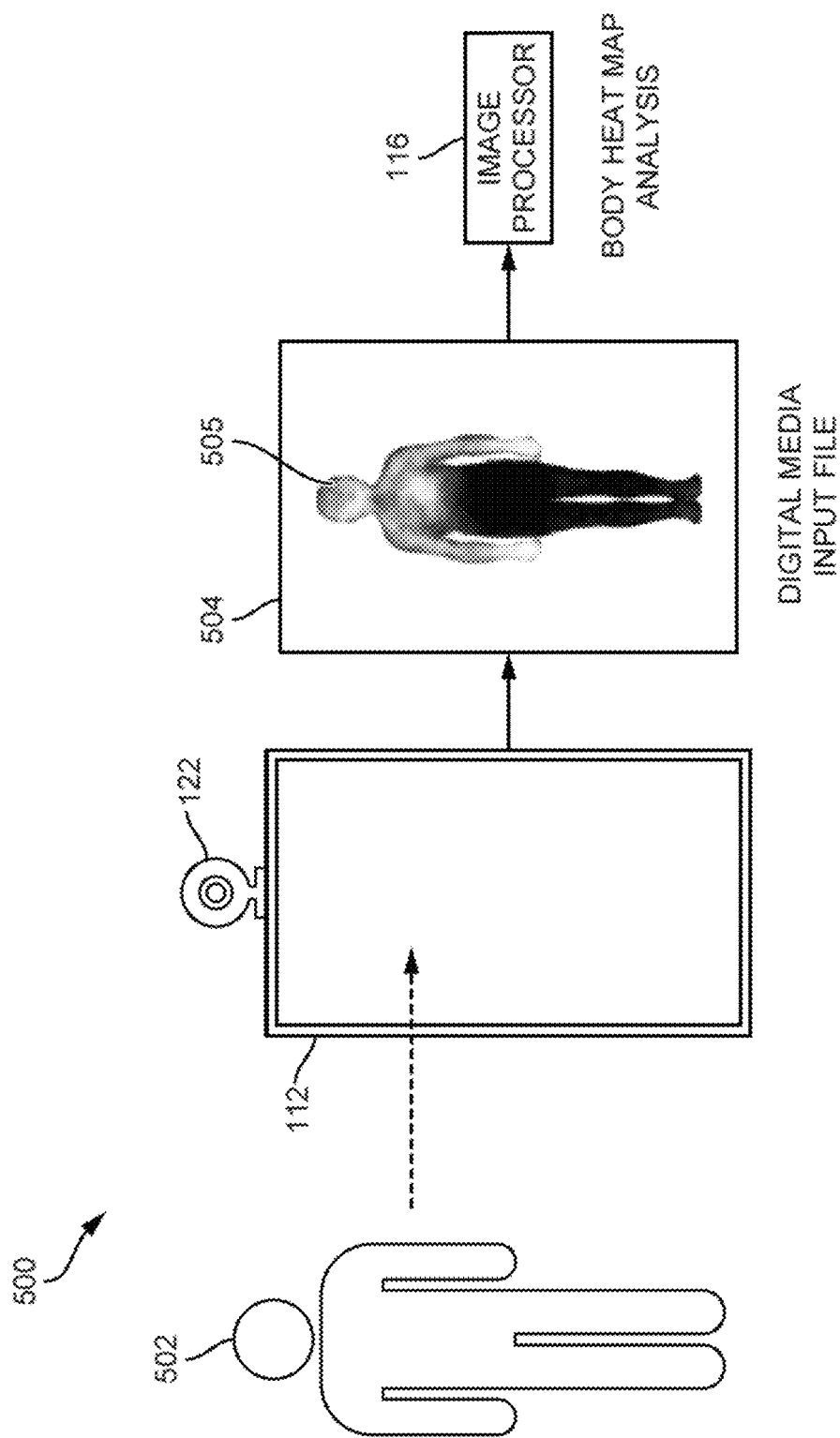
FIG. 5 illustrates another example workflow for creating a digital media file associated with a visitor to physical environment and selecting electronic presentation content based on an analysis of the digital media file according to some embodiments.

FIG. 5 illustrates another example workflow for creating a digital media file associated with a visitor to physical environment and selecting electronic presentation content based on an analysis of the digital media file according to some embodiments. FIG. 5 depicts a physical environment 500, with a visitor, 502. Physical environment 500 also includes a screen 112 and an imaging device, IR imager 122. IR imager 122 is used to produce digital media input file 504. This digital media input file 504 includes body heat map 505 for visitor 502. If the digital media input file includes images other than the body heat map of a visitor or visitors in the infrared image depicted, such as background items, the image can be appropriately processed to obtain the requisite detail over the visitor's body heat map, for example, by zooming, croping or masking. Digital media input file 504 is analyzed by image processor 116 to determine neuro-efferent indicators in body heat map 505, which indicate emotions. The above described statistical analysis and content selection is then carried out.

Figure 6:
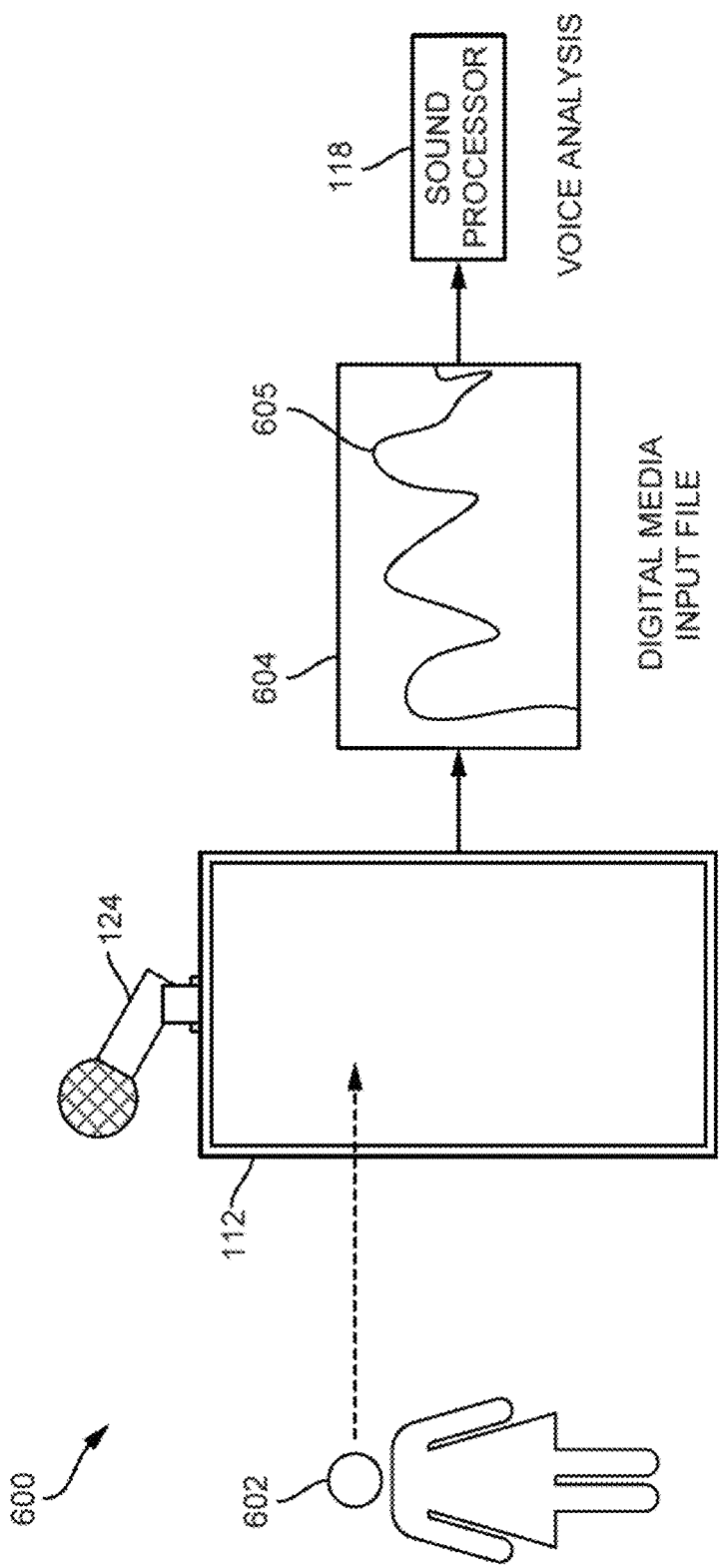
FIG. 6 illustrates an additional example workflow for creating a digital media file associated with a visitor to physical environment and selecting electronic presentation content based on an analysis of the digital media file according to some embodiments.

FIG. 6 illustrates an additional example workflow for creating a digital media file associated with a visitor to physical environment and selecting electronic presentation content based on an analysis of the digital media file according to some embodiments. FIG. 6 depicts a physical environment 600, with a visitor, 602. Physical environment 600 also includes a screen 112 and an microphone 124. Microphone 124 is used to produce digital media input file 604. This digital media input file 604 includes representation of a sound wave 605 from the voice of visitor 602. Digital media input file 604 is analyzed by sound processor 118 using voice analysis to identify neuro-efferent indicators and ultimately to determine the emotion indicated. The above described statistical analysis and content selection is then carried out.

Figure 7:
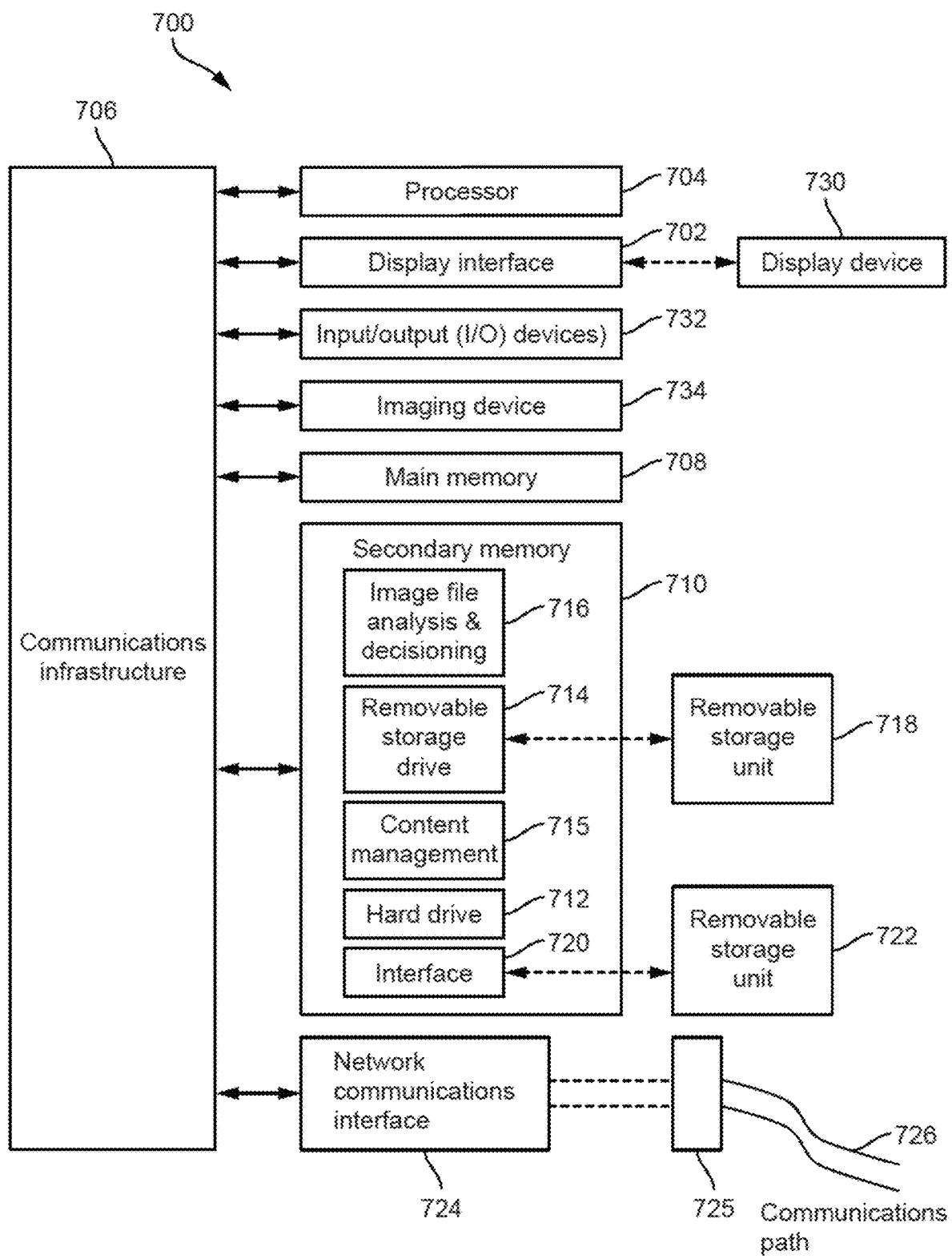
FIG. 7 is a diagram of an example computer system in which embodiments of the present disclosure can be implemented.

Although example embodiments have been described in terms of apparatuses, systems, services, and methods, it is contemplated that certain functionality described herein may be implemented in software on microprocessors, such as a microprocessor chip included in computing devices such as the computer system 700 illustrated in FIG. 7. In various embodiments, one or more of the functions of the various components may be implemented in software that controls a computing device, such as computer system 700, which is described below with reference to FIG. 7. In the example of FIG. 7, it can be assumed that images are being used to determine whether to provide mitigating electronic presentation content to a physical environment, and it can be assumed that the mitigating content is visual in nature. A system using audio to carry out aspects of this disclosure would be similar except that audio subsystems or components would be included in addition to or instead of the display device and the imaging sensor.

To implement the various features and functions described above, some or all elements of the devices (e.g., digital signage device 115) and servers may be implemented using elements of the computer system of FIG. 7. More particularly, FIG. 7 illustrates an example computer system 700 for implementing the techniques in accordance with the present disclosure. Aspects of the present invention shown in FIGS. 1-6, or any part(s) or function(s) thereof, may be implemented using hardware, software modules, firmware, tangible computer readable media having logic or instructions stored thereon, or a combination thereof and may be implemented in one or more computer systems or other processing systems. If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. Although operations may be described in this document as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor 704 may be a special purpose processor device. As will be appreciated by persons skilled in the relevant art, processor 704 may also be a single processor in a multi-core/multiprocessor system, such system operating alone, or in a cluster of computing devices operating in a cluster or server farm. Processor 704 is connected to a communication infrastructure 706, for example, a bus, message queue, network, or multi-core message-passing scheme. In certain embodiments, a processor of one or more of the computing devices and servers described above with reference to FIG. 1 can be embodied as the processor 704 shown in FIG. 7.

Computer system 700 also includes a main memory 708, for example, random access memory (RAM), and may also include a secondary memory 710. Main memory 708 can be used to temporarily store digital media input files 404 or 604 for analysis. Secondary memory 710 may include, for example, a hard disk drive 712, removable storage drive 714. Removable storage drive 714 may comprise a magnetic tape drive, an optical disk drive, a flash memory device, or the like. In non-limiting embodiments, one or more of the memories of digital signage devices and servers discussed above with reference to FIG. 1 can be embodied as the main memory 708 shown in FIG. 7.

The removable storage drive 714 reads from and/or writes to a removable storage unit 718 in a well-known manner. Removable storage unit 718 may comprise a magnetic tape, optical disk, etc. which is read by and written to by removable storage drive 714. As will be appreciated by persons skilled in the relevant art, removable storage unit 718 includes a non-transitory computer readable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or EEPROM) and associated socket, and other removable storage units 722 and interfaces 720 which allow software and data to be transferred from the removable storage unit 722 to computer system 700.

Computer system 700 may also include a network communications interface 724. Network communications interface 724 allows software and data to be transferred between computer system 700 and external devices. Network communications interface 724 may include a modem, a network interface (such as an Ethernet card), a communications port, a PCMCIA slot and card, or the like. Software and data transferred via network communications interface 724 may be in the form of signals, which may be electronic, electromagnetic, optical, or other signals capable of being received by network communications interface 724. These signals may be provided to network communications interface 724 via connector or antenna 725 and a communications path 726. Communications path 726 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 708 and secondary memory 710, which can be memory semiconductors (e.g., DRAMs, etc.). Computer readable medium and non-transitory computer readable medium can also refer to removable storage unit 718, removable storage unit 722, and a hard disk installed in hard disk drive 712. Signals carried over communications path 726 can also embody the logic described herein. These computer program products are means for providing software to computer system 700.

Computer programs (also called computer control logic) are stored in main memory 708 and/or secondary memory 710. Computer programs may also be received via network communications interface 724. Such computer programs, when executed, enable computer system 700 to implement the present embodiments as discussed herein. In particular, the computer programs, when executed, enable processor 704 to implement the processes of the present invention, such as the steps in the methods illustrated by the flowcharts of FIGS. 2 and 3, discussed above. Accordingly, such computer programs represent controllers of the computer system 700. Where the invention is implemented using software, the software may be stored in a computer program product and loaded into computer system 700 using removable storage drive 714, interface 720, and hard disk drive 712, or network communications interface 724.

In an embodiment, display screens 112 of FIGS. 1, 4, 5, and 6 used to display adapted content may be a computer display 730 shown in FIG. 7. The computer display 730 of computer system 700 can be implemented as a touch sensitive display (i.e., a touch screen). The computer display 730 can connect to communications infrastructure via display interface 702 to display electronic content such as the results of process 200 or process 300. For example, the computer display 730 can be an in-store display (e.g., a large in-store screen) used to display targeted content such as a tailored image of a product to be promoted or advertised. As shown in FIG. 7, computer system 700 can also include an input device 732 and an imaging device 734, which can be a camera or IR imager associated with display 730. For instance, imaging device 734 can be a camera integrated with display 730 or mounted on top of display 730. Imaging device 734 can be a webcam or any other suitable video camera capable of capturing video frames of people viewing display 730. Imaging device 734 can also be any IR imager such as an IR camera capable of capturing body heat maps as described above.

In the non-limiting example shown in FIG. 7, secondary memory 710 includes a content management tool 715 and image file analysis and decisioning programs 716. Content management tool 715 and image file analysis and decisioning programs 716 can be implemented as computer programs stored in secondary memory 710. Image file analysis and decisioning programs can include the image processor 116 and the decisioning process 120 of FIG. 1. According to one example, content management tool 715 can be a tool included in a content management system, such as, for example, Adobe® Experience Manager. By using content management tool 715, a marketer can manage an advertising campaign that is displayed via a normal content library when negative neuro-efferent indicators have not triggered mitigating electronic presentation content as previously described. Content management tool 715 can be used to select and modify campaign content.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense)

so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
   accessing, by a computing device, a library of presentation media selections;
   assembling, using the computing device and the library of presentation media selections, electronic presentation content;
   producing, by a computing device in a physical environment, a digital media input file associated with at least one visitor to the physical environment;
   determining, by the computing device, a presence of a negative neuro-efferent indicator in the digital media input file;
   selecting, by the computing device, the electronic presentation content based on the presence of the negative neuro-efferent indicator in the digital media input file; and
   providing the electronic presentation content to the physical environment.

2. The method of claim 1, wherein the digital media input file is associated with a plurality of visitors to the physical environment, and wherein the selecting of the electronic presentation content further comprises selecting the electronic presentation content based on a plurality of negative neuro-efferent indicators corresponding to a proportion of the plurality of visitors.

3. The method of claim 1, further comprising identifying, using the computing device, a plurality of mitigating presentation media selections from the library of presentation media selections.

4. The method of claim 3, wherein the identifying of the plurality of mitigating presentation media selections comprises identifying, using the computing device, a dominant color palette.

5. The method of claim 3, wherein the identifying of the plurality of mitigating presentation media selections comprises identifying, using the computing device, at least one of a sound frequency spectrum, a sound pressure level, or a tempo.

6. The method of claim 1, wherein the digital media input file comprises at least one image captured using a camera, and the determining, by the computing device, the presence of the negative neuro-efferent indicator further comprises:
   analyzing at least one image using the computing device to identify a facial expression;
   comparing the facial expression to a reference library of facial expressions using a model that has been trained with the reference library of facial expressions; and
   producing a confidence level of each of various emotional states including at least one negative state.

7. The method of claim 1, wherein the digital media input file comprises at least one image captured using an infrared image sensor, and the determining, by the computing device, the presence of the negative neuro-efferent indicator further comprises:
   analyzing a body heat map using the computing device to identify color differences across portions of the body heat map;
   comparing the body heat map to a reference heat map based on the color differences; and
   producing a confidence level of each of various emotional states including at least one negative state.

8. A system comprising:
   a computing device;
   a display device;
   at least one image sensor; and
   a memory having instructions stored thereon, that, if executed by the computing device, cause the computing device to perform operations comprising:
      producing, using the at least one image sensor, a digital media input file including a body heat map, the digital media input file being associated with at least one visitor to a physical environment;
      analyzing the body heat map to identify color differences across portions of the body heat map;
      comparing the body heat map to a reference heat map based on the color differences;
      determining a presence of a negative neuro-efferent indicator in the digital media input file based at least in part on the comparing of the body heat map to the reference heat map;
      selecting electronic presentation content based on the presence of the negative neuro-efferent indicator in the digital media input file; and
      providing the electronic presentation content to the physical environment.

9. The system of claim 8, wherein the digital media input file is associated with a plurality of visitors to the physical environment, and wherein the operation of selecting of the electronic presentation content further comprises selecting the electronic presentation content based on a plurality of negative neuro-efferent indicators corresponding to a proportion of the plurality of visitors.

10. The system of claim 8, wherein the operations further comprise:
    accessing a library of presentation media selections;
    identifying a plurality of presentation media selections from the library of presentation media selections; and
    assembling the plurality of presentation media selections into the electronic presentation content.

11. The system of claim 10, wherein the operation of identifying of the plurality of presentation media selections further comprises at least one of identifying a dominant color palette, identifying a sound frequency spectrum, identifying a sound pressure level, or identifying a tempo.

12. The system of claim 8, wherein the digital media input file comprises at least one image captured using a camera, and the operation of determining the presence of the negative neuro-efferent indicator further comprises:
   analyzing at least one image using the computing device to identify a facial expression;
   comparing the facial expression to a reference library of facial expressions using a model that has been trained with the reference library of facial expressions; and
   producing a confidence level of each of various emotional states including at least one negative state.

13. The system of claim 8, wherein the operation of determining the presence of the negative neuro-efferent indicator further comprises producing a confidence level of each of various emotional states including at least one negative state.

14. A non-transitory computer-readable medium storing program code executable by a computing device to perform operations, the operations comprising:
   accessing a library of presentation media selections;
   assembling, using the library of presentation media selections, electronic presentation content;
   producing a digital media input file associated with at least one visitor to the physical environment;
   determining a presence of a negative neuro-efferent indicator in the digital media input file;
   selecting the electronic presentation content based on the presence of the negative neuro-efferent indicator in the digital media input file; and
   providing the electronic presentation content to the physical environment.

15. The computer readable medium of claim 14, wherein the digital media input file is associated with a plurality of visitors to the physical environment, and wherein the operation of selecting of the electronic presentation content further comprises selecting the electronic presentation content based on a plurality of negative neuro-efferent indicators corresponding to a proportion of the plurality of visitors.

16. The computer readable medium of claim 14, wherein the operations further comprise identifying, using the computing device, a plurality of mitigating presentation media selections from the library of presentation media selections.

17. The computer readable medium of claim 16, wherein the operation of identifying of the plurality of mitigating presentation media selections comprises identifying a dominant color palette.

18. The computer readable medium of claim 16, wherein the operation of identifying of the plurality of mitigating presentation media selections comprises identifying, using the computing device, at least one of a sound frequency spectrum, a sound pressure level, or a tempo.

19. The computer readable medium of claim 14, wherein the digital media input file comprises at least one image captured using a camera, and the operation of determining the presence of the negative neuro-efferent indicator further comprises:
   analyzing at least one image using the computing device to identify a facial expression;
   comparing the facial expression to a reference library of facial expressions using a model that has been trained with the reference library of facial expressions; and
   producing a confidence level of each of various emotional states including at least one negative state.

20. The computer readable medium of claim 14, wherein the digital media input file comprises at least one image captured using an infrared image sensor, and the operation of determining the presence of the negative neuro-efferent indicator further comprises:
   analyzing a body heat map to identify color differences across portions of the body heat map;
   comparing the body heat map to a reference heat map based on the color differences; and
   producing a confidence level of each of various emotional states including at least one negative state.

* * * * *